United States Patent [19]
Feldhausen et al.

[11] Patent Number: 5,620,620
[45] Date of Patent: Apr. 15, 1997

[54] BASE WITH INTERNAL FOOT ACCESS

[75] Inventors: Joseph E. Feldhausen; Jeffery P. Schroeder, both of Appleton, Wis.

[73] Assignee: Miller Group, Ltd., Appleton, Wis.

[21] Appl. No.: 383,259

[22] Filed: Feb. 3, 1995

[51] Int. Cl.$^6$ ................................................ B23K 9/00
[52] U.S. Cl. .................... 219/133; 248/680; 290/1 A; 310/89
[58] Field of Search ..................... 219/133, 134; 211/26; 248/231.9, 637, 672, 675, 680, 911, 916; 290/1 A; 312/223.1; 361/825; 310/89

[56] References Cited

U.S. PATENT DOCUMENTS

| | | | |
|---|---|---|---|
| 1,947,713 | 2/1934 | Gumpper et al. | 290/1 A |
| 4,399,382 | 8/1983 | Volkrodt | 310/89 |
| 4,661,734 | 4/1987 | Capuano et al. | 310/89 |
| 5,176,437 | 1/1993 | Remington | 248/680 |

OTHER PUBLICATIONS

Miller Welders catalog excerpt for "Big 40", Mar. 1970.
Owner's Manual Form OM-431G (May 1994) for the Bobcat™ 225G Welder.

*Primary Examiner*—Clifford C. Shaw
*Attorney, Agent, or Firm*—Mark W. Croll; Thomas W. Buckman; John P. O'Brien

[57] ABSTRACT

A self-contained welding machine has the same width as a selected prior welding machine and is interchangeably mountable therewith to a flat surface. The welding machine of the invention has a base that utilizes the full space available above its width by fabricating the base with side walls that lie in respective vertical planes coinciding with the vertical planes that pass through the outermost ends of mounting lugs on the base of the prior welding machine. Mounting holes in the floor of the base are accessible through associated openings in the base side walls. Covers cooperate with the base floor and side walls to create pockets that close the side wall openings while providing access to the mounting holes in the base floor.

20 Claims, 5 Drawing Sheets

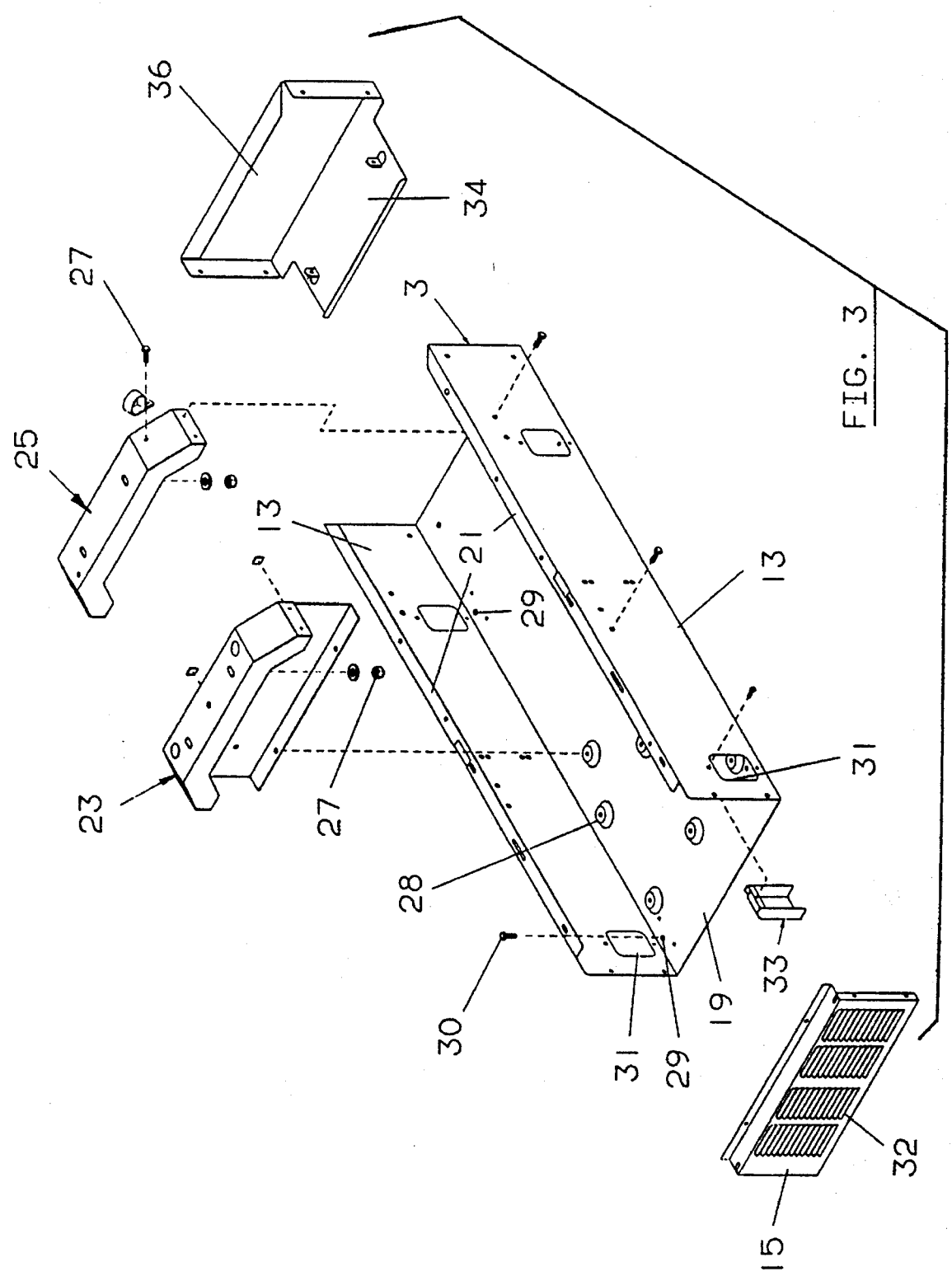

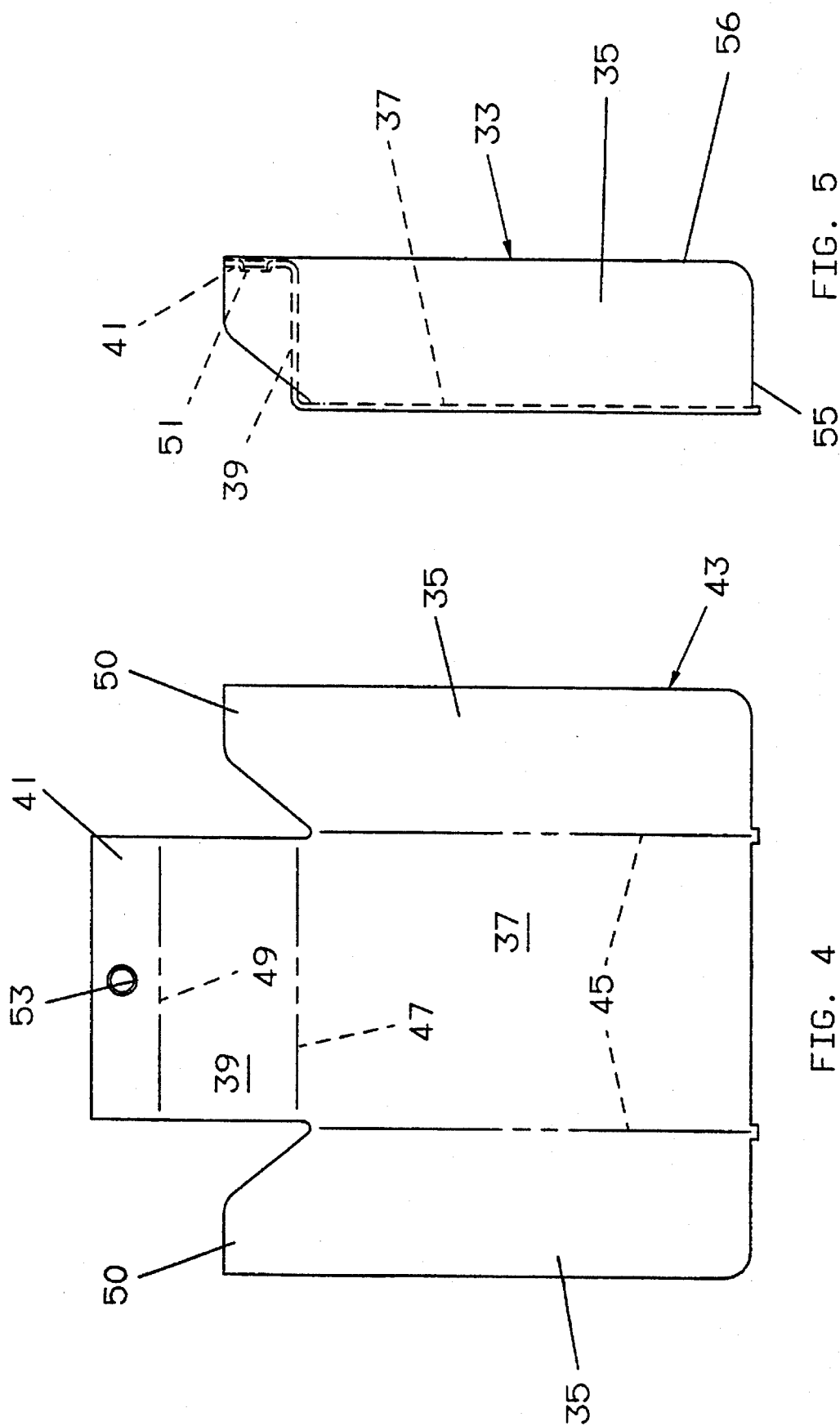

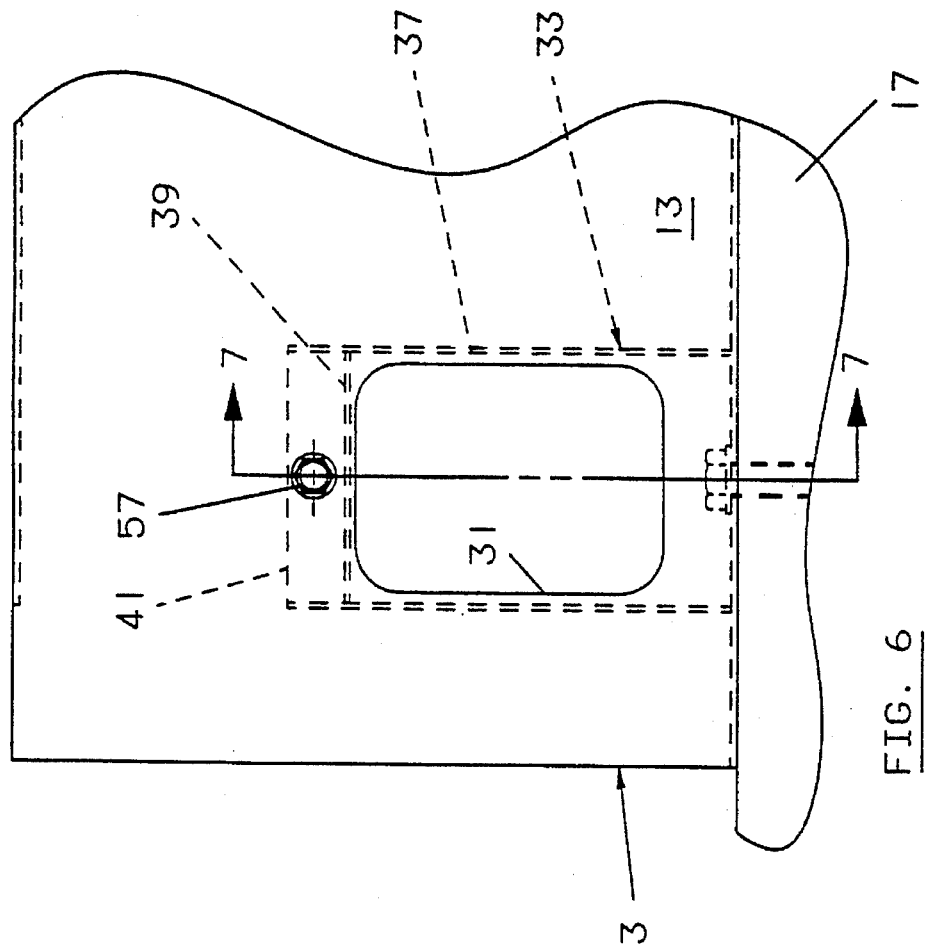
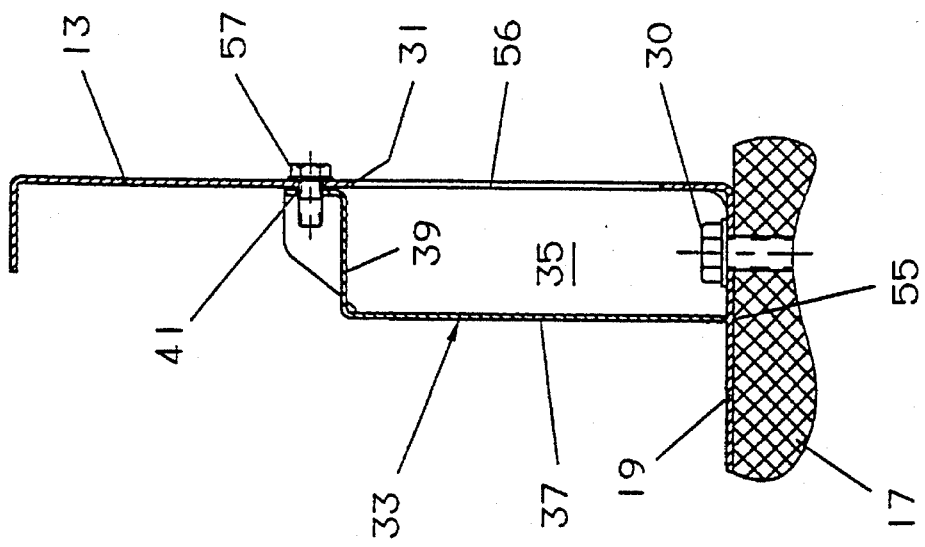

BASE WITH INTERNAL FOOT ACCESS

BACKGROUND OF THE INVENTION

1. Field of the Invention

This invention pertains to welding machines, and more particularly to welding machines that effectively utilize space while being easily mountable to horizontal surfaces.

2. Description of the Prior Art

Self-contained welding machines include a prime mover, generator, electrical components such as resistors and inductors, suitable controls, and welding power output terminals. A sturdy base provides a rigid support for the prime mover, generator, and other components. Aesthetic covers conceal and protect many of the working parts.

Although self-contained welding machines are specifically designed to be transportable, it is often desirable to more or less permanently mount them to a horizontal surface. For that reason, it is known to fabricate their bases with several lugs that protrude from the sides of the base. FIG. 1 shows a typical prior welding machine 2 having a base 4 with end walls 6 and side walls 8. Lugs 10 protrude from the side walls 8 and terminate in respective outermost ends 18. A hole 12 in each lug 10 receives a fastener, not shown, for mounting the welding machine to a horizontal surface.

It is important that self-contained welding machines occupy a minimum of volume so as to fit within transporting vehicles and also within available spaces at job sites. Accordingly, the length and width between the extremities of the welding machine base in contact with a horizontal surface must be as small as possible for a given machine capacity. Conversely, for a given base length and width the various machine components should be arranged to maximize welding machine capacity. For the welding machine 2 of FIG. 1, the width of the base 4 is the distance between the intersections 14 of vertical planes that pass through the outermost ends 18 of the lugs 10 on both sides of the base.

To increase utilization of space, some prior welding machine bases omitted the lugs 10. Instead, the holes for mounting the base to a surface were located inside the base side walls. However, access to the mounting holes and fasteners was then very difficult. The only way to obtain access to the mounting holes and fasteners was to remove the end walls and/or side panels Accordingly, the interior mounting holes of the prior welding machines were of limited usefulness.

SUMMARY OF THE INVENTION

In accordance with the present invention, a base with internal foot access provides easy access to mounting holes located in the interior of the base of a self-contained welding machine. This is accomplished by fabricating the base with side walls having openings therethrough associated with the base mounting holes.

The base is fabricated with a floor and two upstanding side walls. The side walls lie in respective vertical planes that approximately coincide with vertical planes that passed through the outermost ends of the lugs on the base of a similar but smaller prior welding machine. The locations of the base mounting holes in the present invention are the same as in the prior machines. The openings in the base side walls are large enough to provide access for fasteners to be inserted through the floor mounting holes and tightened with a tool. In that manner, the base effectively utilizes the entire space above its length and width in contact with a horizontal surface while being interchangeably mountable on the surface with the prior welding machine.

Further in accordance with the present invention, the openings in the base side walls are closeable with individual covers. Each cover has top, back, and side walls and an open bottom and front. The cover fits inside an opening to create a pocket inside the base side wall that provides access to a base mounting hole. The cover has a resilient tab that is attached to the base side wall in a manner that produces a tension in an attaching screw. The covers enhance the appearance of the base. At the same time they prevent rodents from crawling inside the base and dirt or debris from entering the base through the openings.

The method and apparatus of the invention, using a base having side walls with closeable openings associated with base mounting holes, thus enables a self-contained welding machine to be readily mountable to a horizontal surface. The base is interchangeably mountable with the bases of selected smaller prior welding machines.

Other advantages, benefits, and features of the present invention will become apparent to those skilled in the art upon reading the detailed description of the invention.

BRIEF DESCRIPTION OF THE DRAWINGS

FIG. 3 is an exploded perspective view of the welding machine base and related components according to the present invention.

FIG. 4 is a front view of a piece of material from which the base cover is fashioned.

FIG. 5 is a side view of the base cover.

FIG. 6 is a front view of the base with the base cover in place.

FIG. 7 is a cross sectional view taken along line 7—7 of FIG. 6.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 2:
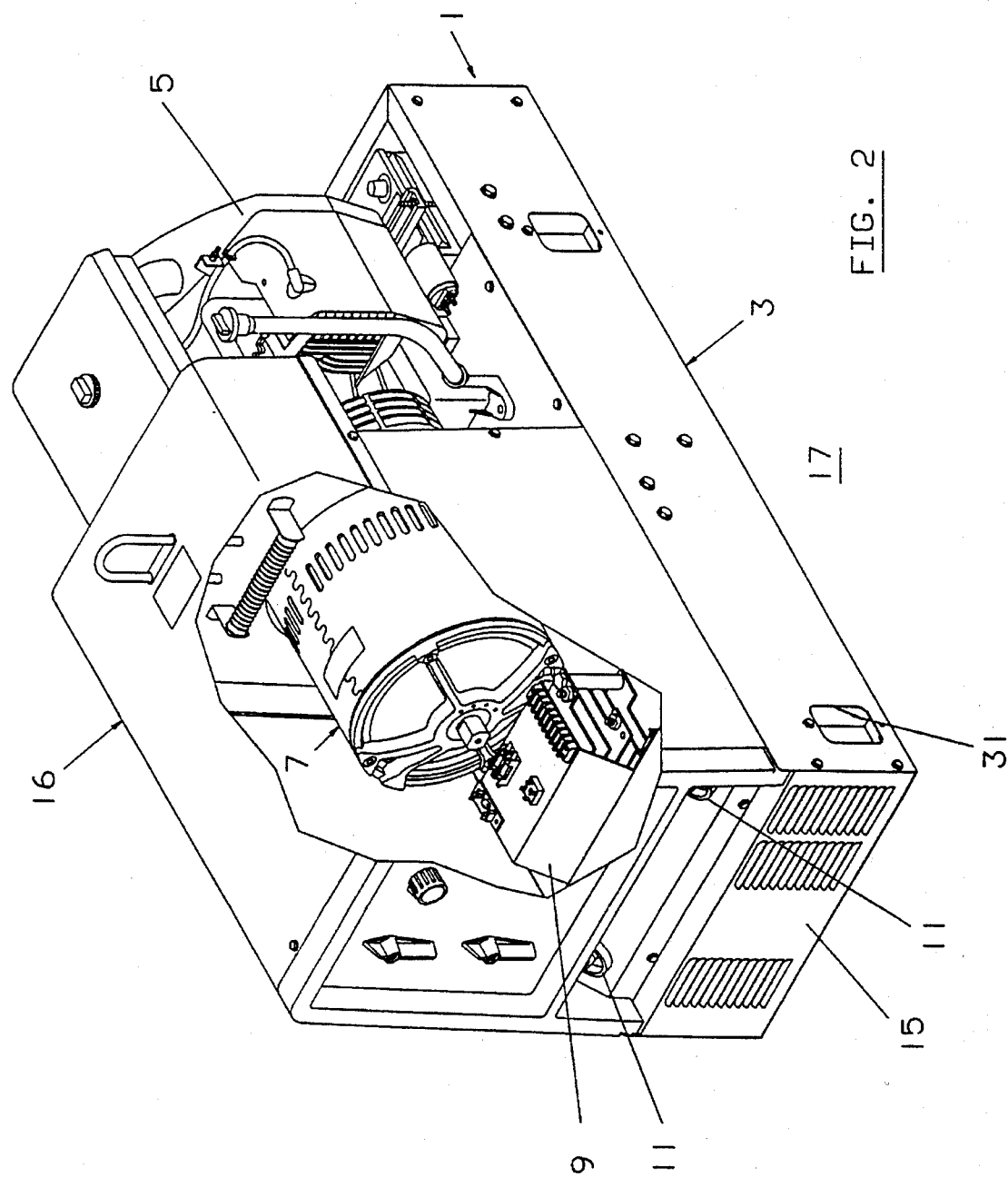
FIG. 2 is a partially broken perspective view of a self-contained welding machine that includes the present invention.

Referring to FIG. 2, a self-contained welding machine 1 is illustrated that includes the present invention. The particular welding machine 1 shown has a base 3 on which are mounted a prime mover 5 and a generator 7. The generator 7 supplies electrical power to electrical components 9. The electrical components 9 convert the electrical power from the generator 7 into welding power available at terminals 11. Covers 16 protect working components such as the generator 7 and components 9 and give the welding machine a neat and finished appearance.

In accordance with the present invention, the base 3 is designed to utilize the entire space above its length and width in contact with a horizontal surface while simultaneously being easily mountable to the surface. Looking also at FIG. 3, the base 3 is fabricated with a floor 19 and two side walls 13 upstanding from the floor. Flanges 21 extend inwardly toward each other from the tops of the side walls 13. A front bracket 23 and a back bracket 25 are fastened to the base by fasteners typically represented at reference numeral 27. The front bracket 23 supports the generator 7, and the back bracket 25 supports the prime mover 5. Bosses 28 on the base floor 19 support the electrical components 9. A front end cover 32 and a back end cover 34 are fastened to opposite ends of the base. The front end cover 32 includes an end wall 15, and the back end cover 34 includes an end wall 36.

The side walls 13 of the base 3 lie in respective vertical planes that approximately coincide with the outermost edges of the mounting lugs of selected prior welding machine bases. For example, the side walls 13 lie approximately in the vertical planes that contain the lines 14 of the prior welding machine 2, FIG. 1. Consequently, the width of the base 3 is the same as the width of the prior machine 2, but the base 3 occupies the full available width.

Figure 1:
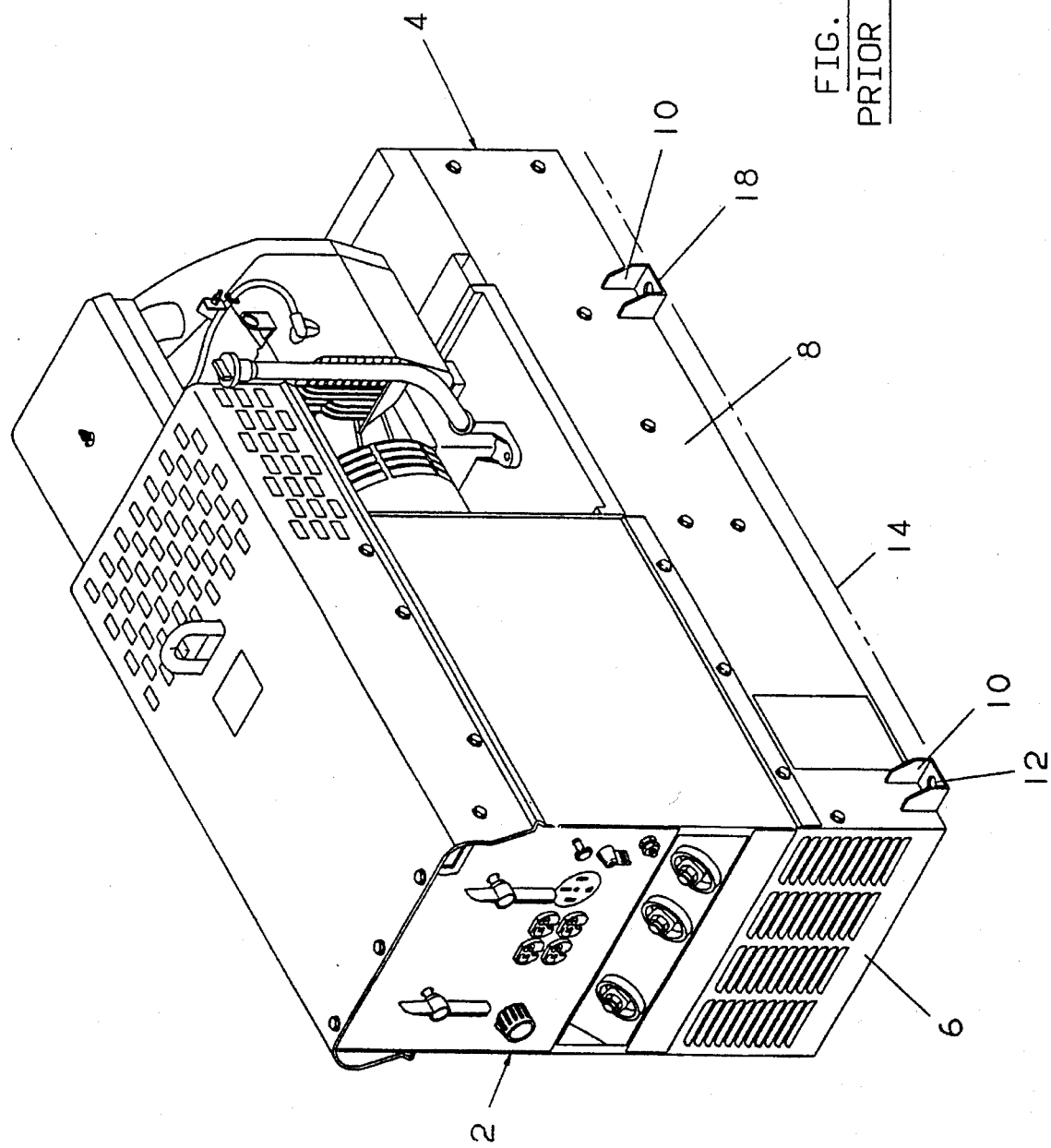
FIG. 1 is a perspective view of a typical prior self-contained welding machine.

To enable the self-contained welding machine 1 to be mounted in the same planes as prior comparable welding machines, such as the welding machine 2 of FIG. 1, the base 3 has holes 29 through its floor 19 that are in the same relative locations as the holes 12 in the lugs 10 of the welding machine 2. Consequently, fasteners 30 passing through the base floor holes 29 can mount the welding machine 1 interchangeably with the prior welding machine.

The results obtained by using the base 3 of the present invention are significant. In one particular welding machine 1, the width between the base side walls 13 increased by three inches. That increase enabled the size of the fuel tank for the prime mover 5 to increase from 7.5 to 8.5 gallons. In addition, the wider base 3 and correspondingly wider covers 16 can accommodate larger generators 7 and electrical components 9, i.e., the welding machine capacity can increase without increasing either the machine width or the height of its covers 16 above the surface 17.

To provide access to the floor holes 29 and fasteners 30, the base side walls 13 are formed with openings 31 therethrough adjacent each hole. The openings 31 are sized and located to enable a person to manipulate the fasteners 30 into the holes and tighten them with a wrench or other tool.

It is a feature of the present invention that the base openings 31 are closeable in a neat and attractive manner while simultaneously maintaining accessibility to the fasteners 30. Turning to FIGS. 4 and 5, a four-sided cover 33 has two side walls 35, a back wall 37, and a top wall 39. A tab 41 upstands from the top wall 39. The cover 33 may be fashioned from a blank 43 of sheet metal folded along foldlines 45, 47, and 49 to create the side walls 35, back wall 37, top wall 39, and tab 41. Preferably, the two side walls have respective wings 50 near the foldline 47. A pad 51 with an extruded hole 53 therethrough is punched into the tab 41. A pair of small ears 52 project from the cover bottom edge 55 in line with the two foldlines 45. It will be noted from FIG. 5 that the side walls have respective coplanar free edges 56. The tab 41 has a front surface 59 that is recessed a slight distance from the plane of the side walls free edges 56. If desired, the cover 31 can be made from a resilient plastic material molded in the shape of FIG. 5 instead of from sheet metal.

Now looking at FIGS. 6 and 7, the covers 33 are designed to fit within the openings 31 of the base 3. With a cover bottom edge 55 resting on the base floor 19, the ears 52 enter associated apertures 61 in the base floor. The cover side walls 35 straddle the opening and the free edges 56 of the side walls abut the base side wall 13. A screw 57 is used to fasten the cover tab 41 to the base side wall. As the screw 57 is tightened, it bends the cover tab 41 until its front surface 59 contacts the base side wall. The internal restoring force of the cover material places a tension on the screw 57 that maintains the screw in place despite machine vibrations and movements.

The cover side walls 35, back wall 37, and top wall 39 cooperate with the base floor 19 and side wall 13 to create a pocket. The screw 30 used to mount the base 3 to the horizontal surface 17 lies within the pocket and is fully accessible through the opening 31. At the same time, the covers 33 close the openings and thereby provide a finished appearance to the welding machine base. The covers prevent dirt and debris from entering the base through the openings, and also prevent mice and other small animals from nesting inside the base at job sites.

Thus, it is apparent that there has been provided, in accordance with the invention, a base with internal foot access that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A base for a self-contained welding machine comprising:
    a. a floor having a pair of opposed longitudinally extending edges and defining at least two holes therethrough proximate respective edges;
    b. a pair of side walls upstanding from the floor edges, each side wall having inside and outside surfaces and defining an uncovered opening therethrough proximate a respective hole in the floor; and
    c. cover means removably joined to the inside surfaces of the base side walls for cooperating with the base side walls and floor to create pockets inside the base, the holes in the base floor and the fasteners being within the associated pockets,
    so that the base can be mounted to a horizontal surface by fasteners passing through the holes in the floor, and the openings in the base side walls provide unhindered access to the holes in the floor and to the fasteners from outside the base side walls.

2. The base of claim 1 wherein the cover means comprises a cover having side walls, a back wall, and a top wall, the side and back walls having respective bottom edges that rest on the base floor, and the side and top walls having respective free edges that about the base side wall.

3. The base of claim 2 wherein the cover means further comprises:
    a. a tab upstanding from the cover top wall; and
    b. screw means for fastening the cover tab to the base side wall.

4. The base of claim 3 wherein the cover means is fashioned from a blank of flat material bent along first and second foldlines to produce the cover back and side walls, a third foldline to produce the cover top wall, and a fourth foldline to produce the cover tab.

5. The base of claim 3 wherein:
    a. the base floor defines at least one aperture proximate each of the holes therethrough;

b. the cover side and back walls define a bottom edge; and c. at least one ear projects from the cover bottom edge, the ear entering an associated aperture in the base floor.

6. The base of claim 5 wherein:

a. the free edges of the cover side walls define a plane;

b. the cover tab has a front surface that is recessed from the plane of the cover side walls free edges; and c. the cover tab bends to contact the base side wall when the screw means fastens the cover tab to the base side wall to thereby produce a tension in the screw means that resists vibrations.

7. The base of claim 1 wherein the base side walls lie in respective vertical planes that approximately coincide with vertical planes passing through the outermost ends of lugs protruding from the base side walls of a selected welding machine, so that the distance between the base side walls of the self-contained welding machine is greater than the distance between the base side walls of the selected welding machine while maintaining the same base width on the horizontal surface as the selected welding machine.

8. The base of claim 7 wherein the holes in the base floor are located in the same relative locations as mounting holes in the lugs of the selected welding machine to thereby enable the self-contained welding machine to be mounted to the horizontal surface interchangeably with the selected welding machine.

9. A self-contained welding machine having a width substantially identical to the width of a selected welding machine that has a base and lugs with holes therethrough and outermost ends protruding from the base comprising:

a. a base comprising:
   i. a floor having longitudinally extending edges and defining at least two holes therethrough each proximate a respective longitudinal edge; and
   ii. a pair of side walls upstanding from the base longitudinal edges and lying in respective vertical planes that coincide with vertical planes that pass through the outermost ends of the lugs of the selected welding machine, the walls defining uncovered openings therethrough proximate the respective holes in the floor;

b. fastener means passing through the holes in the base floor for mounting the base to a surface, the fastening means being accessible without hindrance through the respective openings in the base side walls;

c. cover means associated with each hole through the base floor for cooperating with the base floor and side wall to create a pocket inside the opening in the base side wall while providing unhindered access to the hole through the base floor and to the associated fastener means; and d. bracket means fastened to the base for supporting a prime mover, generator, and electrical components.

10. The self-contained welding machine of claim 9 wherein the cover means comprises a cover having a back wall and two side walls having respective bottom edges that rest on the base floor, the cover side walls straddling the base side wall opening and having generally vertical front edges that abut the base side wall.

11. The self-contained welding machine of claim 10 wherein:

a. the cover further has a tab upstanding from the cover top wall; and b. the cover means further comprises fastener means for fastening the cover tab to the base side wall.

12. The self-contained welding machine of claim 9 wherein:

a. the base floor defines a pair of apertures therethrough proximate each of the holes through the base floor; and b. a pair of ears project from the bottom edge of the cover back and side walls, the ears entering associated apertures in the base floor.

13. The self-contained welding machine of claim 12 wherein:

a. the front edges of the cover side walls define a plane;

b. the cover tab has a front surface that is recessed from the plane of the cover side walls front edges; and c. the cover tab bends to contact the base side wall when the fastener means fastens the cover tab to the base side wall to thereby produce tension in the fastener means that enables the fastener means to resist vibrations.

14. A method of manufacturing a self-contained welding machine having the same width as a selected welding machine having a base with a predetermined length and lugs protruding therefrom that define respective holes therethrough and that terminate in respective outermost ends comprising the steps of:

a. determining the width of the selected welding machine;

b. fabricating a base for the self-contained welding machine comprising the steps of:
   i. providing a floor having opposed ends and a plurality of holes therethrough;
   ii. providing a pair of side walls upstanding from the base and passing through respective vertical planes that are in the same relative locations as vertical planes passing through the outermost ends of the lugs of the base of the selected welding machine; and
   iii. forming uncovered openings through the side walls each adjacent the respective holes through the base floor;

c. placing the base of the self-contained welding machine on a flat surface;

d. passing fasteners through respective openings in the base side walls and through the associated holes in the base floor;

e. inserting a tool through the openings in the base side walls and tightening the fasteners to thereby mount the self-contained welding machine to the surface; and f. creating pockets inside the base that close the openings in the base side walls around the holes through the base side floor while maintaining unhindered access through the base side walls to the holes through the base floor and to the fasteners.

15. The method of claim 14 wherein the step of creating pockets inside the base comprises the steps of:

a. providing a cover having back, side, and top walls associated with each opening in the base side wall; and b. placing the cover on the base floor with the cover side walls straddling an opening in the base side wall and abutting the base side wall with the cover side and top walls and thereby creating a pocket inside the base that closes the base side wall opening while providing access to the associated hole through the base floor.

16. The method of claim 15 comprising the further steps of:

a. providing a tab upstanding from the cover top wall; and b. joining the cover tab to the base side wall.

17. The method of claim 16 wherein the step of joining the cover tab to the base side wall comprises the steps of:

a. inserting ears on the cover into associated apertures in the base floor;

b. passing a fastener through the base side wall and into the cover tab; and c. bending the cover tab and producing a tension in the fastener and thereby enabling the fastener to resist vibrations.

18. A cover for closing an opening in a side wall of a base of a self-contained welding machine comprising:

a. a back wall having a bottom edge;

b. a pair of side walls intersecting the back wall and having respective free edges that define a vertical plane, the side walls having respective bottom edges that are coplanar with the back wall bottom edge;

c. a top wall joined to the back wall; and d. a tab joined to the top wall and being generally parallel to the back wall.

19. The cover of claim 18 further comprising a pair of ears projecting from the bottom edge of the back and side walls.

20. The cover of claim 18 wherein the tab has a front surface that is recessed from the plane of the side walls free edges.

* * * * *